United States Patent [19]

Aron

[11] 4,149,364
[45] Apr. 17, 1979

[54] MACHINE FOR TEDDING AND/OR WINDROWING CUT FODDER

[75] Inventor: Jerome Aron, Dossenheim sur Zinsel, France

[73] Assignee: Kuhn, S.A., Saverne, France

[21] Appl. No.: 772,956

[22] Filed: Feb. 28, 1977

[30] Foreign Application Priority Data

Mar. 5, 1976 [FR] France .................. 7607290

[51] Int. Cl.$^2$ ............................. A01D 79/00
[52] U.S. Cl. ........................... 56/366; 56/370
[58] Field of Search ............... 56/370, 365, 366, 367

[56] References Cited

U.S. PATENT DOCUMENTS

| | | | |
|---|---|---|---|
| 3,827,224 | 8/1974 | Mulder et al. | 56/370 |
| 3,832,838 | 9/1974 | Hale | 56/370 X |
| 3,841,073 | 10/1974 | van der Lely | 56/370 |
| 3,890,769 | 6/1975 | van der Lely | 56/370 X |
| 3,995,416 | 12/1976 | van der Lely | 56/370 |
| 4,015,413 | 4/1977 | van der Plas et al. | 56/370 |

*Primary Examiner*—Russell R. Kinsey
*Attorney, Agent, or Firm*—Young & Thompson

[57] ABSTRACT

The disclosure is of a haymaking machine for the tedding and/or windrowing of fodder, comprising at least two rotors the axes of which form a certain angle with the ground, these rotors being interconnected by a hollow beam through which there passes a transmission shaft intended to drive the rotors with a rotating movement about their respective axes, said machine cooperating in the windrowing position with guide elements situated to the rear and fixed respectively each to one of the ends of arms extending towards the front of the machine, characterized in that the other end of at least one of the arms cooperates with means for modifying the angle of inclination of the rotors when the guide element of said arm is actuated.

12 Claims, 13 Drawing Figures

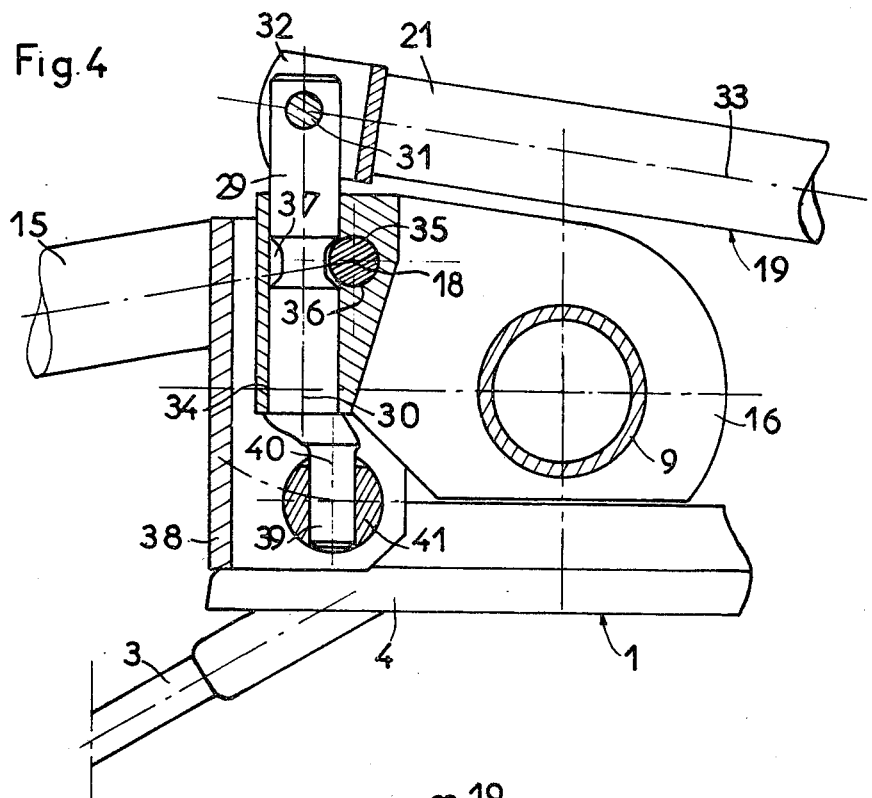
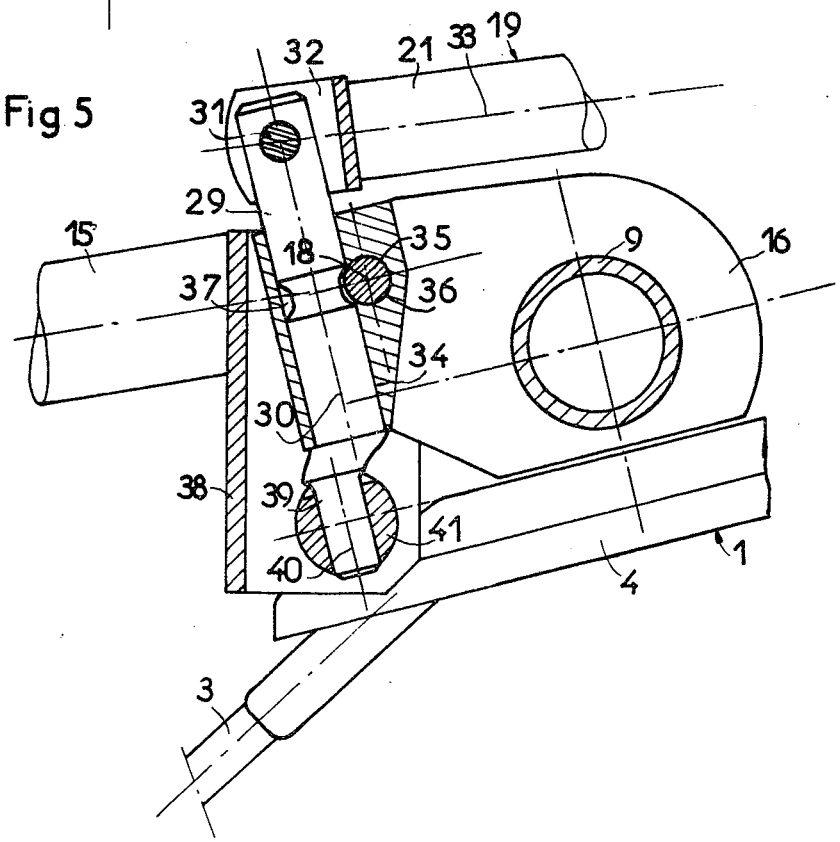

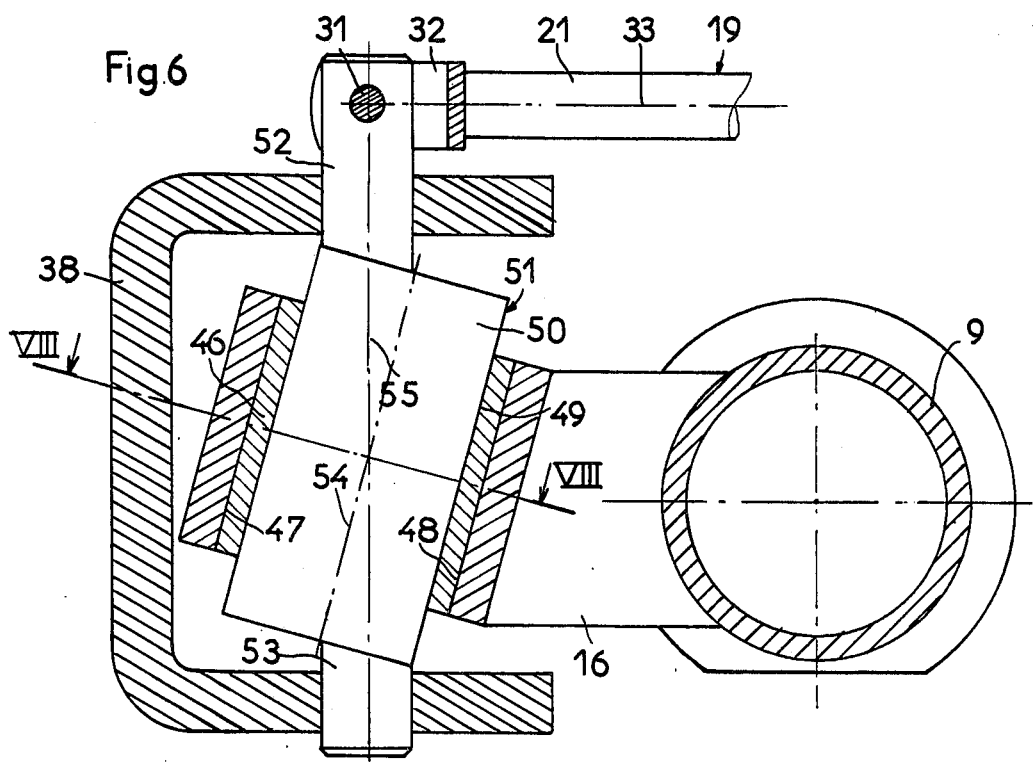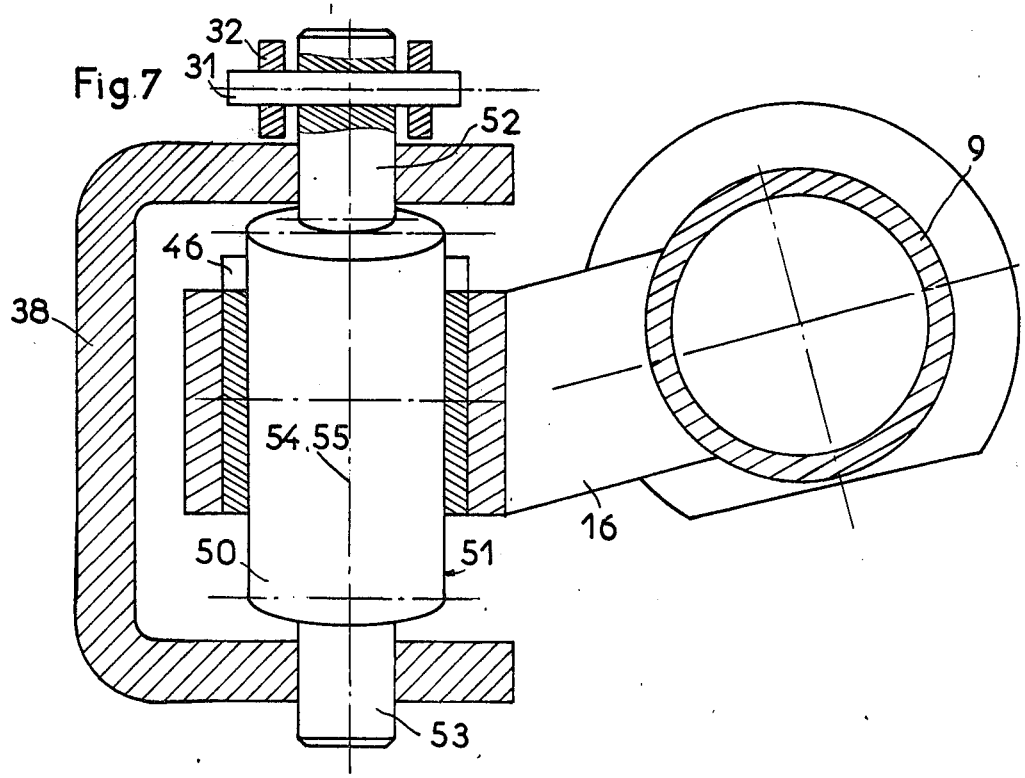

MACHINE FOR TEDDING AND/OR WINDROWING CUT FODDER

INTRODUCTION AND BACKGROUND OF THE INVENTION

The present invention concerns agricultural machines of the haymaking-machine type for the tedding and/or windrowing of fodder, comprising at least two rotors whose axes form a certain angle with the ground. These rotors are interconnected by a hollow beam or a tube through which there passes a transmission shaft intended to drive the rotors with a rotating movement about the said axes. Such machines, when they are situated in the windrowing position, co-operate with guide elements or windrowing screens situated to the rear of the machine and fixed to the latter by means of arms extending towards the front of the machine.

In order to transform the machines of this kind so that they may move from their tedding position into their windrowing position and conversely, it is generally necessary to effect three distinct operations. In fact the working position of the tools must be modified according to whether it is intended to carry out tedding or windrowing, and the axes of the rotors must be inclined or erected for example by means of a screw/nut system or any other device. Finally the guide elements must be retracted or placed in position for the formation of the windrow. All these operations are impractical in execution since it is necessary to act upon various regions of the machine, involving a certain loss of time. Moreover as the size of the angle of inclination of the rotors is left to the free estimation of the user of the machine, the latter may be induced to proceed by trial and error to find the optimum angle of inclination. This procedure thus is detrimental to the economy of the machines on which the regulation of the angle of action of the rotors is carried out by a hand crank and/or with the aid of the prop of the third point of the hitch device of the tractor driving said machine.

BRIEF SUMMARY OF THE INVENTION

The present invention remedies these drawbacks by virtue of a device which, in the positioning or retraction of the guide elements serving for the formation of the windrow, causes the erection or inclination of the rotors of a haymaking machine as described above. Thus the present invention permits of facilitating the use of machines of the tedder/windrower type while improving their economy since the angle of inclination of the rotors is automatically determined as a function of the position of the said guide elements.

FURTHER DESCRIPTION AND ADVANTAGES OF THE INVENTION

Such a result can be achieved by reason of the fact that the machine according to the invention comprises arms equipped respectively at one end each with a guide elements, at least one of these arms comprising means at its other end which, on operation of its guide element permitting of passing the machine from its windrowing position into its tedding position and conversely, said operation automatically causing a modification of the angle of the inclination of the rotors.

The invention will be explained in greater detail hereinafter with further characteristics and advantages by reference to several non-limitative examples of embodiment of the invention which are described with reference to the accompanying drawings,

BRIEF DESCRIPTION OF THE VIEWS IN THE DRAWINGS

In the said drawings:

FIG. 1 represents a plan view of the machine according to the present invention situated in the windrowing position, FIG. 2 represents a side view of the same machine situated in the windrowing position, FIG. 3 represents a side view of the same machine when situated in the tedding position, FIG. 4 shows the device permitting of modifying the angle of inclination of the rotors of the machine, in section and on a large scale, the machine being situated in the windrowing position, FIG. 5 represents the same device as that in FIG. 4, the machine being situated in the tedding position, FIG. 6 represents a variant of embodiment of the device permitting of modifying the angle of inclination of the rotors of the machine in section and on a large scale, the machine being situated in the windrowing position, FIG. 7 represents the same device as that according to FIG. 6, the machine being situated in the tedding position, FIG. 8 represents a plan view in section along the line VIII—VIII in FIG. 6, FIG. 9 represents a partial rear view of the machine showing the position of the guide elements when the machine is in the tedding position, FIG. 10 shows a side view of the machine in the windrowing position, this machine being equipped with a third variant of the device permitting of modification of the angle of inclination of the rotors, FIG. 11 shows a lateral view of the same machine when situated in the tedding position, FIG. 12 represents the device with which the machine as represented in FIGS. 10 and 11 is equipped, in section on a large scale, in the windrowing position, FIG. 13 represents the device with which the machine as represented in FIGS. 10 and 11 is equipped, in the tedding position, in section and on a large scale.

DETAILED DESCRIPTION OF THE PREFERRED EMBODIMENTS

Figure 1:
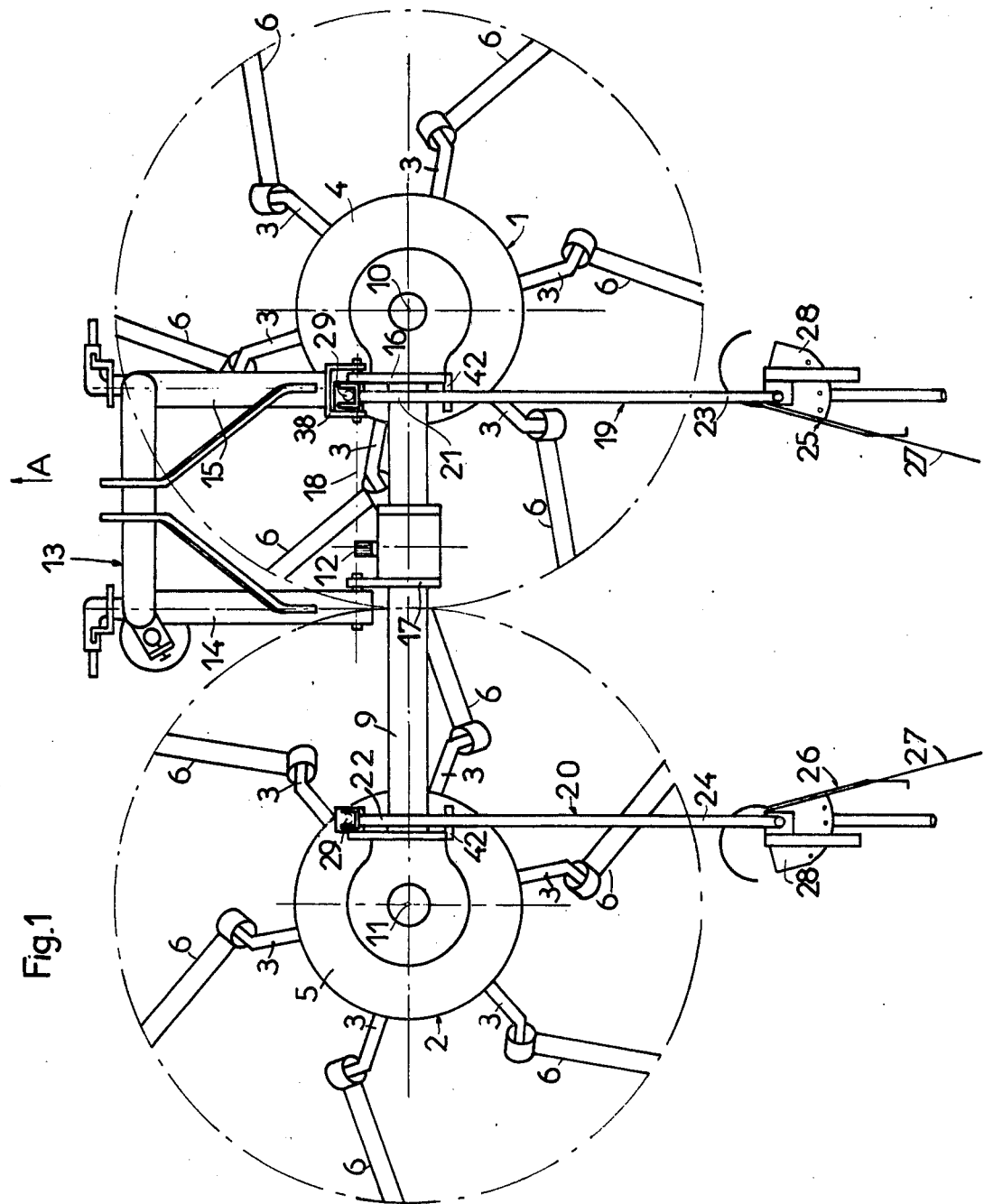
Figure 2:
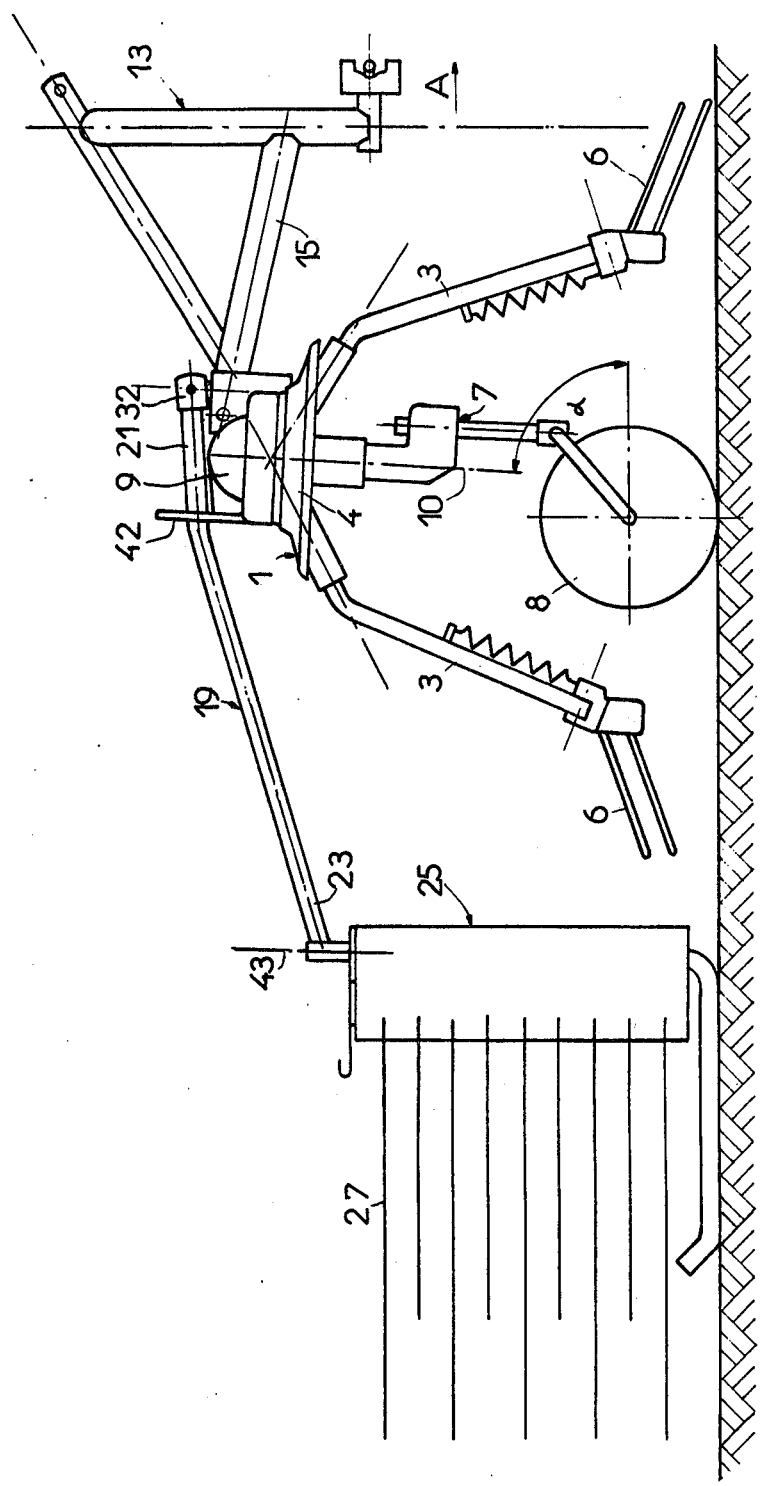
Figure 3:
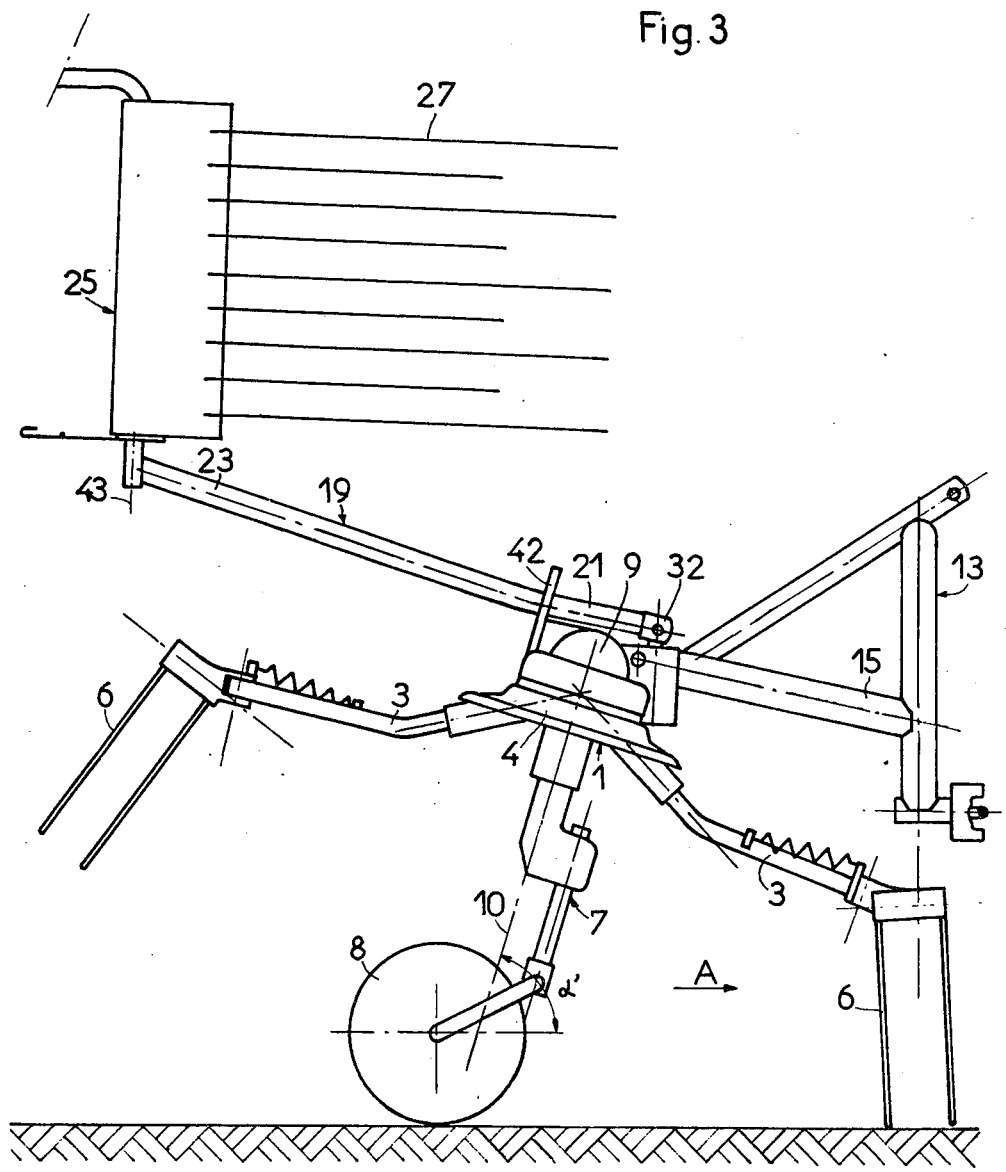

In the drawings, FIGS. 1 to 5 represent a first variant of embodiment of the machine according to the invention. This machine, which is of the tedder-windrower type, comprises two rotors 1 and 2 respectively equipped with arms 3 fixed at one end to the hubs 4 and 5 of the rotors 1 and 2. At their other ends these arms are provided with working tools 6 co-operating with springs such as those disclosed in U.S. Pat. No. 3,820,314. Each of the rotors 1 and 2 is supported respectively in the working position by a column 7 extending between a wheel 8 resting on the ground and the hubs 4, 5 of the said rotors 1, 2. A hollow beam 9 interconnects the rotors 1 and 2 and contains a transmission shaft intended to drive them with a rotating movement about their respective axes 10, 11. The transmission shaft is not represented in the Figures. Only its splined end 12, driven by the power take-off of the tractor, is visible in FIG. 1. A hitch device 13 is provided at the front of the machine. This device 13 is intended to be attached to the three-point linkage of a tractor and comprises especially two beams 14 and 15 one of which terminates substantially in the middle of the beam 9 and the other terminates at one of the beam 9 immediately above the level of the hub 4 of the machine. These beams 14 and 15 co-operate respectively with legs 16, 17 fixed to the tube 9. These legs 16, 17 are in fact articulated to the hitch device 13 about a horizontal axis 18 substantially perpendicular to the intended direction A of travel of the machine, the rotors 1 and 2 of the machine pivoting about this axis 18 in order to move from their tedding position into their windrowing position and conversely. The machine also comprises arms 19 and 20 fixed respectively to the machine at one of their ends 21, 22 immediately above the level of the hubs 4, 5. The other ends 23 and 24 of the arms 19 and 20 are respectively provided with a guide element 25 and 26 each comprising a grill 27 designed for the windrowing of the fodder. A device 28 permits orienting these grills 27 so that they are more or less parallel with the intended direction A of travel of the machine. FIGS. 4 and 5 will be described below, which respectively represent the means permitting the axes 10, 11 of the rotors 1, 2 of the machine according to the invention to be inclined by a certain angle α in relation to the ground when the arm 19 is situated in a first position corresponding to the windrowing position as illustrated in FIGS. 1, 2 and 4. These same means permit the machine to be inclined by an angle α′, substantially less than 90° when the arm 19 is situated in a second position corresponding to the tedding position as illustrated by FIGS. 3 and 5. The axes 10 and 11 which determine the angle α with the ground, said angle α being slightly less than 90°, and the angle α′, are inclined towards the front of the machine so that the fodder may be projected towards the rear of the machine when it is in the tedding position. The means which permit of modifying the angle of inclination of the rotors 1, 2 by movement of the guide element 25 alone co-operate with the extremity 21 of the arm 19 and comprise a pivot 29 the axis 30 of which is substantially perpendicular to the ground when the machine is in the windrowing position. An articulation spindle 31 fixed to the upper part of the pivot 29 extends perpendicularly of the axis 30 of the pivot 29. This articulation spindle 31 is articulated in a fork 32 fixed to the extremity 21 of the arm 19. Thus this arm 19 can oscillate freely in a substantially vertical plane. This permits the guide element 25, situated at its other extremity 23, to follow the irregularities of the ground with great precision, thus contributing to the formation of a regular and uniform windrow. The pivot 29, which is rotatably articulated in the bore 34 of the leg 16 fixed on the beam 9 interconnecting the rotors 1 and 2, is immobilised in this bore 34 by means of a cylindrical spindle 35. The latter extends parallel with the articulation spindle 31 fixed on the pivot 29 and passes through an opening 36 provided in the leg 16. This opening 36 is situated in a plane perpendicular to the axis 30 of the pivot 29 so that the spindle 35 situated therein can co-operate with an annular groove 37 provided on the pivot 29, permitting the latter to pivot on itself while being immobilised in translation. The spindle 35 is moreover fixed to a fork 38 secured on the beam 15 of the hitch device 13 of the machine. This spindle 35 is situated on the articulation axis 18 of the two rotors 1 and 2 interconnected by the beam 9. Finally the pivot 29 comprises at its lower part a crank pin 39 the axis 40 of which is parallel with the axis 30 of the pivot 29. This crank pin 39, which is thus eccentric of the pivot 29, engages in a pin 41 the axis of which is substantially parallel with the articulation axis 30 fast with the pivot 29 and with the axis of the spindle 35. This pin 41 is articulated in rotation and translationally movable in the fork 38 of the beam 15 of the hitch device 13 of the machine.

The operation of the above-described device is as follows. In order to pass from the windrowing position of the machine as represented in FIGS. 1, 2 and 4 to the tedding position as represented in FIGS. 3 and 5, the arm 19 is pivoted towards the front of the machine in a plane substantially parallel with its travel direction A. This pivoting, which takes place about the axis 31 with the aid of the guide element 25 which is easy of access, travels through an angle greater than 90°. Then the same arm 19 is pivoted about the pivot 29 so that the said arm 19 again extends towards the rear of the machine and it can be aligned in its support 42. The rotation of the pivot 29 likewise involves the rotation of the crank pin 39. Now as the pivot 29 is immobilised in translation in the bore 34 of the leg 16 by means of the spindle 35 and as the distance between the axis 18 of the spindle 35 and the axis 40 of the pin 41 is fixed, the pivot 29 must incline in order to be able to pivot about its axis 30. This inclination then compels the whole leg 16, fast with the beam 9 connecting the rotors 1 and 2 to pivot about the spindle 35 situated on the pivot axis 18 of the rotors 1 and 2, which causes their inclination. In order that the deflector 25 may not be an encumbrance, it is sufficient to pivot it forward through 180° about its vertical axis 43 so that it may be situated in the position as represented in FIG. 3. Then the identical procedure is adopted with the arm 20 the pivot 29 of which does not comprise a crank pin 39. The rotation of this pivot 29 thus does not involve an inclination of the rotors 1, 2, since this has already been carried out by the rotation of the pivot 29 of the arm 19. Then it only remains to adapt the working tools 6 of the machine in order to be able to carry out tedding.

In order to transfer the machine from its tedding position into its windrowing position, it is sufficient to proceed in the converse manner to that described above.

A second variant of embodiment of the invention will be described below with reference to FIGS. 6 to 9. In these Figures the elements identical with those represented in FIGS. 1 to 5 bear the same references and will not be described afresh in detail.

Figure 8:
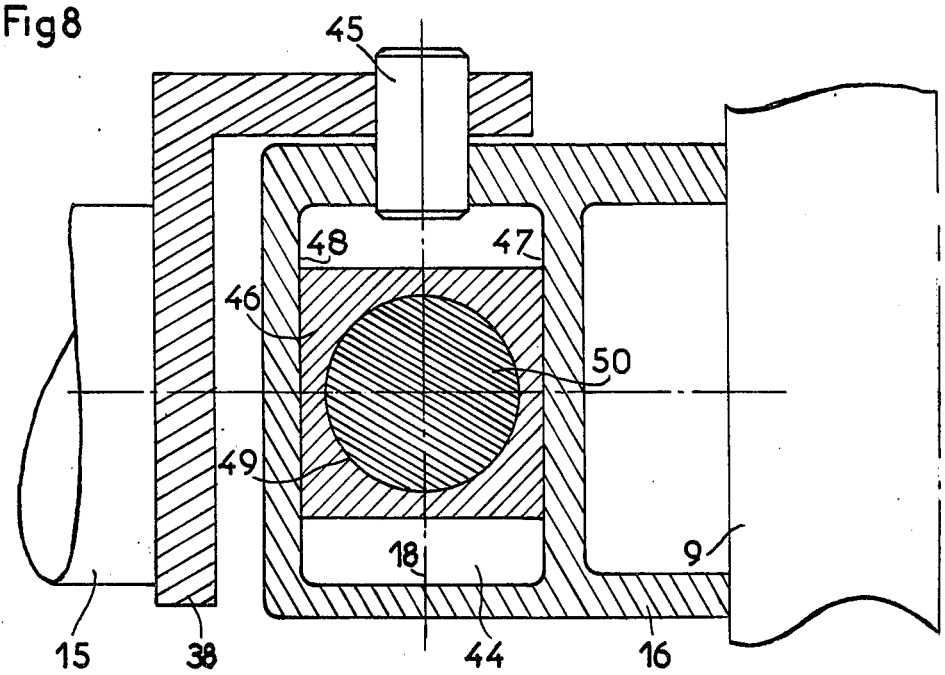

In this second variant the leg 16 fast with the beam 9 interconnecting the two rotors 1 and 2 is provided with a hole 44 of rectangular section, visible in FIG. 8. This leg 16 is articulated to the fork 38 of the beam 15 of the hitch device 13 of the machine by means of a pin 45 disposed along the axis 18 about which the rotors 1 and 2 pivot in order to pass from their tedding position into their windrowing position and conversely. The leg 17 is articulated in the same manner to the beam 14 of the hitch device 13.

A ring 46 of rectangular section is lodged in the hole 44, being guided by the inner walls 47 and 48 of the said hole 44. This ring 46 is pierced with a bore 49 through which passes the cylindrical part 50 of a pivot 51. This cylindrical part 50 is situated between two crank pins 52 and 53 engaging respectively in the fork 38 of the beam 15 of the hitch device 13 of the machine. The axis 54 of this cylindrical part 50, which is eccentric in relation to the crank pins 52, 53, is inclined in relation to the axis 55 of the pivot 51 disposed substantially perpendicularly in relation to the ground.

Figure 9:
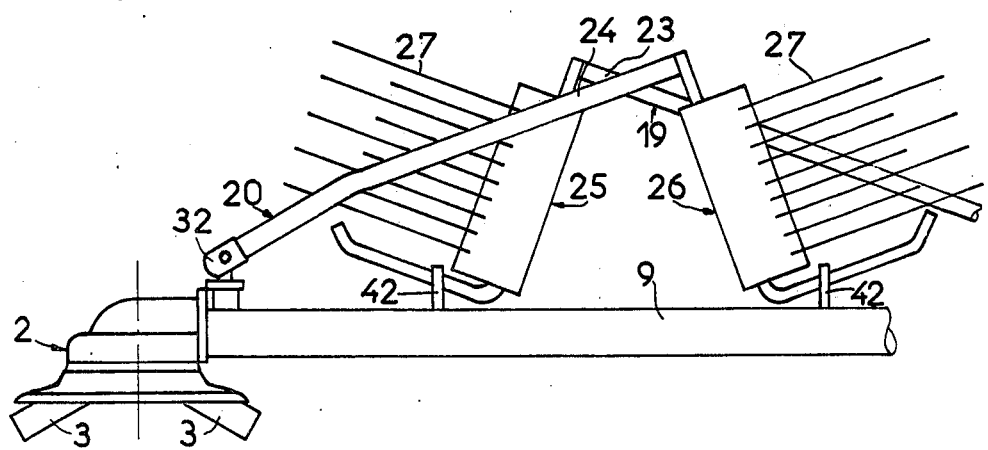
Figure 10:
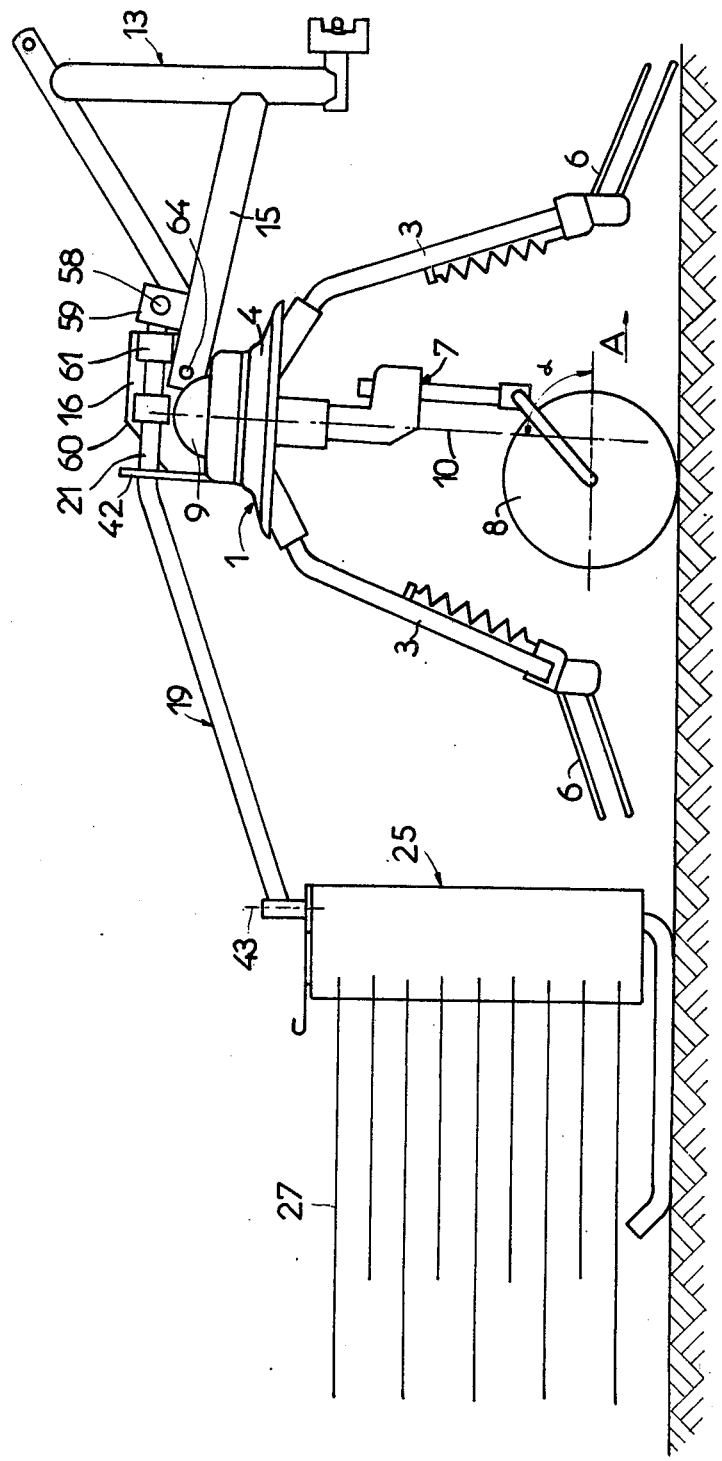
Figure 11:
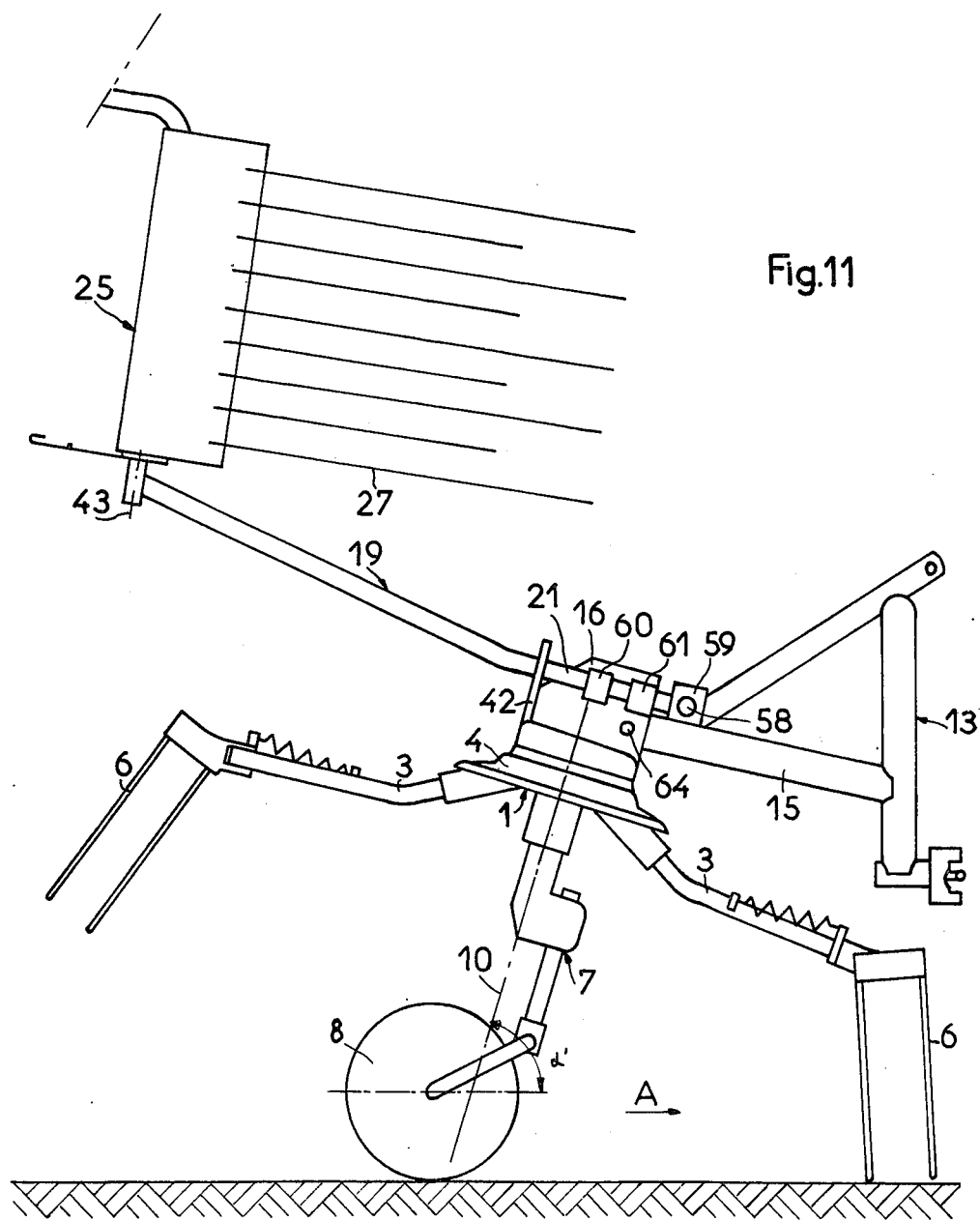

The upper extremity of the upper crank pin 52 comprises, identically with the upper extremity of the pivot 29 described with reference to the first variant of embodiment of the invention, an articulation spindle 31 extending perpendicularly to the axis 55 of the pivot 51. This articulation spindle 31 is articulated in a fork 32 fast with the end 21 of the arm 19. This arm 19 thus has the same possibilities of oscillation as the arm 19 as described with reference to the first variant of embodiment of the invention. Moreover it is seen in FIG. 9 that the arms 19 and 20 are likewise provided with guide elements 25 and 26 at their ends 23 and 24.

The operation of this second variant of embodiment is as follows. When it is desired to transfer the machine from its windrowing position into its tedding position, it is sufficient simply to raise the arm 19 slightly by an angle less than 90°, inclining it towards the front of the machine in a plane substantially parallel with its travel direction A. The fork 32 of the arm 19 then pivots about the articulation spindle 31 of the upper crank pin 52 of the pivot 51 until the lower part of the guide element 25 is at the level of the beam 9. Then the arm 19 is pivoted through 90° about the axis 55 of the pivot 51. This rotation likewise causes the rotation of the cylindrical part 50 the axis 54 of which is inclined in relation to the axis 55 of the pivot 51. This involves the inclination of the leg 16 and consequently of the rotors 1 and 2, by pivoting of the pin 45 in the fork 38 of the beam 15 of the hitch device 13 of the machine so that the pivot 51 passes from the position as represented in FIG. 6 to that represented in FIG. 7.

Then the guide element 25 is hooked into its support 42 mounted on the beam 9, the arm 20 is manoeuvred in the same manner as the arm 19 and the working tools 6 are adjusted so that the machine can carry out the tedding work.

In order to cause the machine to pass from its tedding position into its windrowing position, it is sufficient to proceed in the manner converse to that described above.

FIGS. 10 to 13 relate to a third variant of embodiment according to the invention. In these Figures the elements identical with those represented in FIGS. 1 to 9 bear the same references and will not be described afresh in detail.

Figure 12:
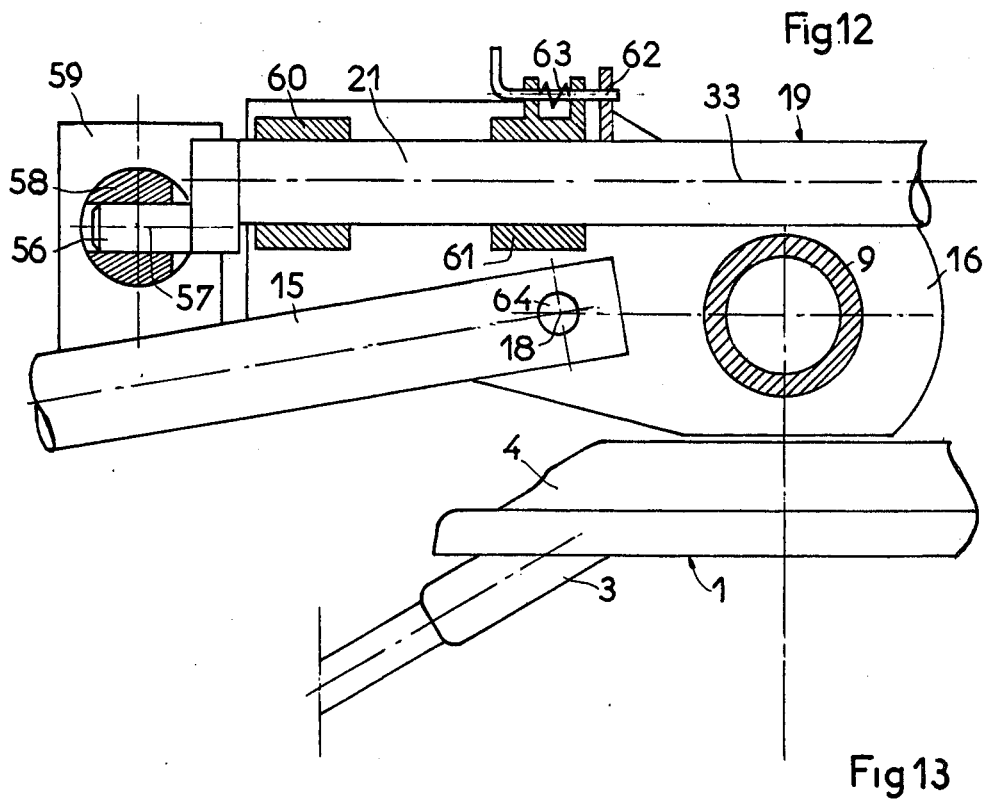
Figure 13:
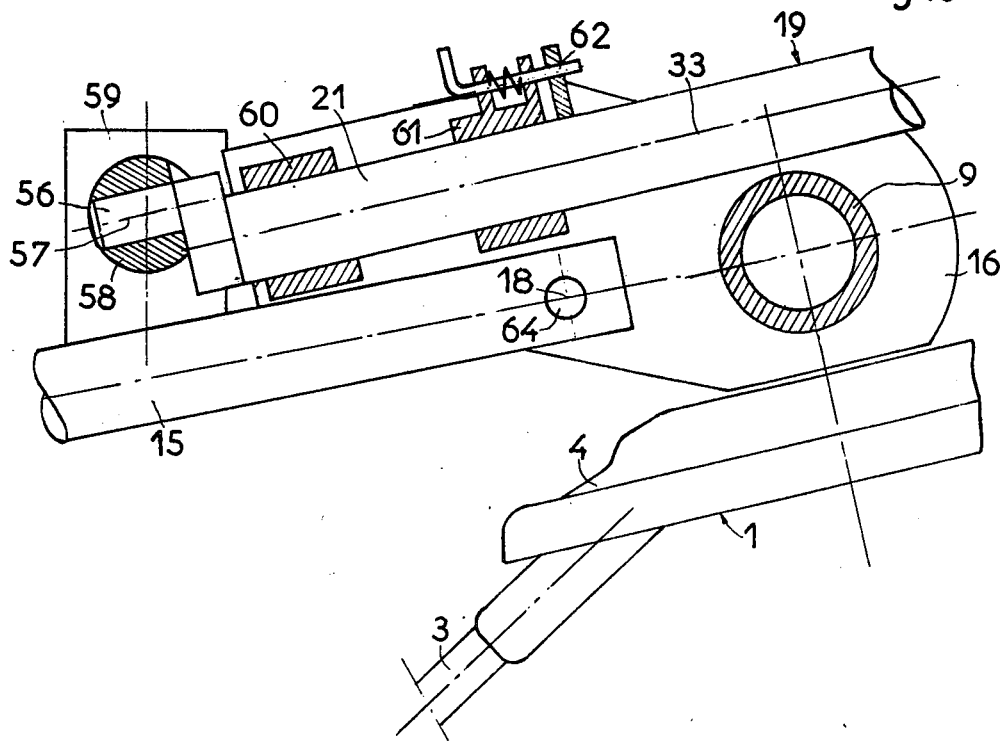

From FIGS. 12 and 13 it may be seen that according to this latter variant the end 21 of the arm 19 in itself alone constitutes the pivot permitting of varying the angle of inclination of the rotors 1 and 2. In fact an eccentric 56 the axis 57 of which is parallel with the axis 33 of the arm 19 engages in a pin 58 the axis of which is perpendicular to the axes 33 and 57 of the arm 19 and to that of the eccentric 56. This pin 58 is rotatably articulated in a fork 59 fast with the beam 15 of the hitch device 13 of the machine.

The arm 19 is guided in rotation in bearings 60 and 61 fast with the leg 16 fixed to the tube 9 connecting the two rotors 1 and 2. A lock 62 with spring 63 permits of immobilising the arm 19 in relation to its bearings 60 and 61. The leg 16 and the leg 17 are respectively articulated by means of a spindle 64 to the beams 14 and 15 so as to permit the passage from the tedding position of the machine into its windrowing position and conversely, by pivoting about the axis 18 shown in FIG. 1.

The operation of the device according to this third variant of embodiment is as follows. In order to pass the machine from its windrowing position into its tedding position, the lock 62 is freed and then the arm 19 is pivoted about its own axis 33 by an angle substantially equal to 180°. The eccentric 56 being able only to pivot about the axis 33 of the arm 19 and about the axis of the pin 58 in which it is engaged, the rotation of the arm 19 compels the leg 16 to incline by pivoting about the axis 18 shown in FIG. 1, this axis 18 being materialized by the articulation spindle 64 visible in FIGS. 10 to 13. The pivoting of the arm 19 alone thus causes the inclination of the rotors 1 and 2. So that the machine may be used in the tedding position, it is necessary now only to bolt the lock 62 in order to immobilise the arm 19 in its new position. The guide element 25 of the arm 19 is finally turned back through 180° towards the front about its vertical axis 43.

The arm 20 of the machine and the guide element 26 are operated in the same manner, which makes the machine ready to be utilised in the tedding position, after adjustment of the tools 6.

In order to return the machine into its windrowing position it is sufficient to proceed in the converse manner to that just described.

In all the descriptions of the manner of operation of the devices as given above, the operation of the arms 19 and 20 is effected by grasping the guide elements 25 and 26 respectively. These are in fact particularly easily accessible and can thus without difficulty serve to impart to the arms 19 and 20 all the movements necessary to pass the machine from its windrowing position into its tedding position and conversely.

The present invention is not limited to the three examples of embodiment which have been described above. In fact various improvements, modifications or additions may be carried out thereto or certain elements may be replaced by equivalent elements, without departing from the scope of the invention.

What is claimed is:

1. A haymaking machine for tedding and/or windrowing of fodder, comprising at least two rotors the axes of which form an angle with the ground, a hollow beam interconnecting said rotors, a transmission shaft passing through said hollow beam and driving the rotors in rotation about their respective axes, arms carried by the machine and extending rearwardly of the machine, guide elements carried by the rear ends of the arms for guiding fodder between the guide elements during a windrowing operation, said arms being swingable between a position in which said guide elements are adjacent the ground to the rear of said rotors for windrowing and a position displaced from said windrowing position for tedding, and means responsive to said swinging movement of at least one said arm to modify the angle of inclination of the rotors whereby said rotors are in a windrowing position when said guide elements are in said windrowing position and said rotors are in a tedding position when said guide elements are in said displaced position.

2. A machine as claimed in claim 1, in which said tedding and windrowing positions of said rotors differ from each other according to the angle of said axes with the ground.

3. A machine as claimed in claim 1, said responsive means comprising a pivot for at least one of said arms, said pivot having an eccentric rotatable about a fixed portion of the machine, said pivot being pivotally interconnected with said hollow beam thereby to rotate said hollow beam to change the angle of said rotors.

4. A machine as claimed in claim 3, and means mounting said beam for bodily swinging movement on and relative to the machine about an axis parallel to but spaced from the axis of the beam.

5. A machine as claimed in claim 3, and the forward end of at least one said arm comprising a fork articulatively interconnected with said pivot to rotate said pivot.

6. A machine as claimed in claim 4, in which the pivot extends in a plane substantially perpendicular to the ground and in that it comprises a crank pin the axis of which is parallel with the axis of the pivot, this crank pin engaging in a pin substantially parallel with the articulation spindle fixed to the pivot, this pin being articulated in a hitch device of the machine, said pivot being movable in rotation in a bore of the leg fixed to the beam interconnecting the rotors of the machine, this pivot being immobilized translationally in the said bore by means of a spindle situated on the axis about which the rotors pivot in order to pass from their tedding position into their windrowing position and conversely.

7. A machine as claimed in claim 6, in which the spindle is fixed to the hitch device of the machine, this spindle passing through an annular groove provided on the pivot, said spindle extending through the leg fixed to the beam interconnecting the rotors of the machine.

8. A machine as claimed in claim 3, in which the pivot comprises two crank pins capable of pivoting about an axis substantially perpendicular to the ground, these crank pins pivoting in a fork of a hitch device of the machine, the leg fixed to the beam interconnecting the rotors of the machine being provided with a hole through which there extends a cylindrical part of the pivot situated between the two crank pins, this cylindrical part being inclined in relation to the axis of the crank pins of the pivot, said leg likewise comprising a pin articulated in a fork and disposed on the axis about which the rotors pivot in order to pass from their tedding position into their windrowing position and conversely.

9. A machine as claimed in claim 8, in which a ring of polygonal section is interposed between the cylindrical part of the pivot and the walls of the hole.

10. A machine as claimed in claim 3, in which the pivot is situated in the extension of its arm, the eccentric of this pivot cooperating with a pin substantially perpendicular to the axis of the arm and articulated in a hitch device of the machine, the leg fixed to the beam interconnecting the rotors of the machine comprising means for the guidance of the arm and a lock for the immobilization of the said arm, also an articulation spindle permitting the rotors to pivot in relation to the linkage device of the machine, this spindle cooperating with the said hitch device to permit the machine to pass from its tedding position into its windrowing position and conversely.

11. A machine as claimed in claim 10, in which the eccentric is situated at the end of the arm guided in bearings fixed to the leg.

12. A machine as claimed in claim 3, in which the guide elements are articulated about a spindle substantially perpendicular to the ground.

* * * * *